United States Patent
Ou-Yang et al.

(10) Patent No.: US 12,216,001 B2
(45) Date of Patent: *Feb. 4, 2025

(54) DEVICE AND METHOD FOR DETECTING A LIGHT IRRADIATING ANGLE

(71) Applicant: NATIONAL YANG MING CHIAO TUNG UNIVERSITY, Hsinchu (TW)

(72) Inventors: Mang Ou-Yang, Hsinchu (TW); Yung-Jhe Yan, Taipei (TW); Guan-Yu Huang, Kaohsiung (TW); Tse Yu Cheng, Taoyuan (TW); Chang-Hsun Liu, New Taipei (TW); Yu-Siou Liu, Changhua County (TW); Ying-Wen Jan, Hsinchu (TW); Chen-Yu Chan, Hsinchu (TW); Tung-Yun Hsieh, Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 310 days.

This patent is subject to a terminal disclaimer.

(21) Appl. No.: 17/699,695

(22) Filed: Mar. 21, 2022

(65) Prior Publication Data
US 2023/0194338 A1    Jun. 22, 2023

(30) Foreign Application Priority Data
Dec. 22, 2021 (TW) ................. 110148215

(51) Int. Cl.
*G01J 1/44* (2006.01)
*G01J 1/42* (2006.01)

(52) U.S. Cl.
CPC .............. *G01J 1/44* (2013.01); *G01J 1/4257* (2013.01); *G01J 2001/4266* (2013.01); *G01J 2001/444* (2013.01)

(58) Field of Classification Search
CPC .... G01J 1/44; G01J 1/4257; G01J 2001/4266; G01J 2001/444; G01J 1/0437; G01J 1/4228; G01J 1/0266
See application file for complete search history.

(56) References Cited

U.S. PATENT DOCUMENTS 7,145,121 B1 * 12/2006 Cook, Jr. ................. G01J 1/44
257/E27.128
2011/0048403 A1 * 3/2011 Stavrou .................. F24S 50/20
126/573

(Continued)

FOREIGN PATENT DOCUMENTS

JP        2672643 B2 * 12/1990
JP     2008070223 A     3/2008

(Continued)

OTHER PUBLICATIONS

Office Action with appended Search Report, which was issued to Japanese counterpart application No. 2022-018918 Issued on Nov. 22, 2022.

(Continued)

*Primary Examiner* — Thanh Luu
*Assistant Examiner* — Monica T Taba
(74) *Attorney, Agent, or Firm* — Rosenberg, Klein & Lee (57) ABSTRACT

A device and a method for detecting a light irradiating angle are disclosed. The device, used to detect the incident direction of a light ray, includes a solar sensor and a processor. The sensing unit of the solar sensor has sensing areas. The sensing areas correspondingly generate sensing signals based on the intensity of the light ray. A mask covers the sensing unit and has an X-shaped light transmitting portion. The light ray transmits the X-shaped light transmitting portion to form an X-axis light ray and a Y-axis light ray. The X-axis light ray intersects the Y-axis light ray. The X-axis light ray and the Y-axis light ray fall on the sensing area. The processor, coupled to the sensing unit, receives the sensing signals and determines information of the incident direction according to the sensing signals.

5 Claims, 5 Drawing Sheets

(56) References Cited

U.S. PATENT DOCUMENTS

2013/0019920 A1   1/2013  Kinsey
2014/0264700 A1   9/2014  Janson
2014/0374575 A1*  12/2014 Takesue ............. G01B 9/02002
                                              250/208.5

FOREIGN PATENT DOCUMENTS

JP    2018077399 A   5/2018
TW     201812245 A   4/2018
TW     202115391 A   4/2021

OTHER PUBLICATIONS

Office Action with appended Search Report, which was issued to Taiwanese counterpart application No. 110148215 Issued on Nov. 21, 2022.
Korotkov, et al., "A Pinhole Sun Sensor for Balloon-Borne Experiment Attitude Determination," Journal of Astronomical Instrumentation, vol. 2, No. 1 (2013).
Ning Xie, et al., "An Autonomous Microdigital Sun Sensor by a CMOS Imager in Space Application", IEEE Transactions on Electron Devices, vol. 59, No. 12, Dec. 2012.
Guan-Yu Huang, et al., "Preliminary Study of Sun Sensors", International Conference on Astronautics and Space Exploration (iCASE), Hsinchu, Taiwan, Nov. 14, 2020.

\* cited by examiner

DEVICE AND METHOD FOR DETECTING A LIGHT IRRADIATING ANGLE

This application claims priority of application No. 110148215 filed in Taiwan on 22 Dec. 2021 under 35 U.S.C. § 119; the entire contents of all of which are hereby incorporated by reference.

BACKGROUND OF THE INVENTION

Field of the Invention

The present invention relates to a technology for detecting light information, particularly to a device and a method for detecting a light irradiating angle.

Description of the Related Art

With the development of aerospace technology, the application of flight control systems is becoming more and more important. The positioning system for the sun in space is an important part, which can not only maximize the efficiency of solar panels, but also provide the orientation for a pose controlling system to maintain the normal operation of the satellite.

The solar sensor is the most important technology, which has the advantages of high resolution and small size. How to improve the viewing angle of the solar sensor and ensure the normal operation of the solar sensor is the purpose of the invention.

To overcome the abovementioned problems, the present invention provides a device and a method for detecting a light irradiating angle, so as to solve the afore-mentioned problems of the prior art.

SUMMARY OF THE INVENTION

The primary objective of the present invention is to provides a device for detecting a light irradiating angle, which integrates a four-quadrant solar sensor to reduce the volume of the module and increase the precision of the solar sensor.

Another objective of the present invention is to provides a device for detecting a light irradiating angle, which adds a calibration sensor for calibrating noise. Thus, the solar sensor can immediately calibrate noise based on the ambient temperature or other environmental parameters, thereby increasing the accuracy of sensing light.

Further objective of the present invention is to provides a device and a method for detecting a light irradiating angle, which utilizes a special algorithm to calculate a light irradiating angle, thereby generating a more precise light irradiating angle.

In order to achieve the foregoing purposes, the present invention provides a device for detecting a light irradiating angle used to detect the incident direction of a light ray. The device includes a solar sensor and a processor. The solar sensor includes a sensing unit and a mask. The sensing unit has a first sensing area, a second sensing area, a third sensing area, and a fourth sensing area. The first sensing area, the second sensing area, the third sensing area, and the fourth sensing area are respectively configured to generate a first sensing signal, a second sensing signal, a third sensing signal, and a fourth sensing signal based on the intensity of the light ray. The mask covers the sensing unit and has an X-shaped light transmitting portion. The light ray transmits the X-shaped light transmitting portion to form an X-axis light ray and a Y-axis light ray. The X-axis light ray intersects the Y-axis light ray. The intersection of the X-axis light ray and the Y-axis light ray falls on one of the first sensing area, the second sensing area, the third sensing area, and the fourth sensing area. The processor is coupled to the sensing unit and configured to receive the first sensing signal, the second sensing signal, the third sensing signal, and the fourth sensing signal and determine the information of the incident direction based on the first sensing signal, the second sensing signal, the third sensing signal, and the fourth sensing signal.

In an embodiment, the sensing unit is a square sensing unit that has crossing lines. The crossing lines divide the sensing unit into the first sensing area, the second sensing area, the third sensing area, and the fourth sensing area and divide each edge of the square sensing unit into a first line segment and a second line segment. The ratio of the length of the first line segment to the length of the second line segment is 2:8 or 8:2.

In an embodiment, the device for detecting a light irradiating angle further includes a calibration sensor. The calibration sensor is arranged adjacent to the solar sensor and coupled to the processor. The calibration sensor is configured to generate and transmit a basing signal to the processor. The processor is configured to incorporate the basing signal, the first sensing signal, the second sensing signal, the third sensing signal, and the fourth sensing signal into representative calibration equations to lead a first calibration sensing signal, a second calibration sensing signal, a third calibration sensing signal, and a fourth calibration sensing signal. The representative calibration equations include:

$$I_1 - D_1 \times \text{magnification} = I_{1c};$$

$$I_2 - D_1 \times \text{magnification} = I_{2c};$$

$$I_3 - D_1 \times \text{magnification} = I_{3c}; \text{ and}$$

$$I_4 - D_1 \times \text{magnification} = I_{4c};$$

where $I_1$ represents the first sensing signal, $I_2$ represents the second sensing signal, $I_3$ represents the third sensing signal, $I_4$ represents the fourth sensing signal, $D_1$ represents the basing signal, $I_{1c}$ represents the first calibration sensing signal, $I_{2c}$ represents the second calibration sensing signal, $I_{3c}$ represents the third calibration sensing signal, and $I_{4c}$ represents the fourth calibration sensing signal.

In an embodiment, the information of the incident direction includes a falling point position. The falling point position is led by incorporating the first calibration sensing signal, the second calibration sensing signal, the third calibration sensing signal, and the fourth calibration sensing signal into representative falling point equations. The representative falling point equations includes:

$$I_{1c} > I_{3c} \& I_{4c} > I_{2c} \rightarrow \text{falling on the first sensing area};$$

$$I_{1c} > I_{3c} \& I_{2c} > I_{4c} \rightarrow \text{falling on the second sensing area};$$

$$I_{3c} > I_{1c} \& I_{2c} > I_{4c} \rightarrow \text{falling on the third sensing area}; \text{ and}$$

$$I_{3c} > I_{1c} \& I_{4c} > I_{2c} \rightarrow \text{falling on the fourth sensing area}.$$

In an embodiment, the information of the incident direction includes an X-axis incident angle and a Y-axis incident angle. The processor is configured to incorporate the first calibration sensing signal, the second calibration sensing signal, the third calibration sensing signal, and the fourth calibration sensing signal into a first representative equation to lead the X-axis incident angle. The first representative equation includes $$\theta_x = \tan^{-1}\left(\frac{(c_L I_{2c} + c_U I_{1c}) - (c_D I_{3c} + c_R I_{4c})}{c_R I_{4c} + c_U I_{1c} + c_L I_{2c} + c_D I_{3c}}\right) \cdot C.$$

The processor is configured to incorporate the first calibration sensing signal, the second calibration sensing signal, the third calibration sensing signal, and the fourth calibration sensing signal into a second representative equation to lead the Y-axis incident angle. The second representative equation includes $$\theta_y = \tan^{-1}\left(\frac{((1-c_U)I_{1c} + (1-c_R)I_{4c}) - ((1-c_D)I_{3c} + (1-c_L)I_{2c})}{(1-c_R)I_{4c} + (1-c_U)I_{1c} + (1-c_L)I_{2c} + (1-c_D)I_{3c}}\right) \cdot C,$$

where $\theta_x$ represents the X-axis incident angle, $\theta_y$ represents the Y-axis incident angle, $c_U$ represents a weight of the first sensing area, $c_L$ represents a weight of the second sensing area, $c_D$ represents a weight of the third sensing area, $c_R$ represents a weight of the fourth sensing area, and C represents a constant.

The present invention provides a method for detecting a light irradiating angle that includes: generating a first sensing signal, a second sensing signal, a third sensing signal, and a fourth sensing signal based on the intensity of a light ray, wherein the first sensing signal, the second sensing signal, the third sensing signal, and the fourth sensing signal are respectively generated by a first sensing area, a second sensing area, a third sensing area, and a fourth sensing area of a sensing unit; calibrating the first sensing signal, the second sensing signal, the third sensing signal, and the fourth sensing signal to respectively generate a first calibration sensing signal, a second calibration sensing signal, a third calibration sensing signal, and a fourth calibration sensing signal; determining the falling point position of the light ray based on currents of the first calibration sensing signal, the second calibration sensing signal, the third calibration sensing signal, and the fourth calibration sensing signal; and determining the X-axis incident angle and the Y-axis incident angle of the light ray based on the first calibration sensing signal, the second calibration sensing signal, the third calibration sensing signal, and the fourth calibration sensing signal.

Below, the embodiments are described in detail in cooperation with the drawings to make easily understood the technical contents, characteristics and accomplishments of the present invention.

DETAILED DESCRIPTION OF THE INVENTION

Figure 1:
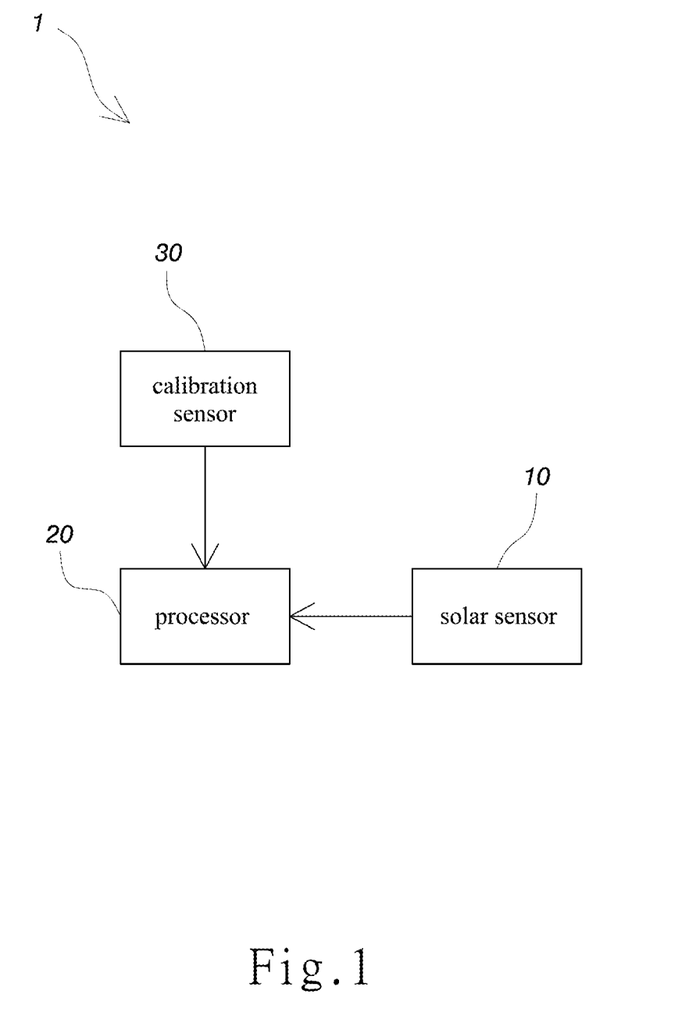
FIG. 1 is a schematic diagram illustrating a device for detecting a light irradiating angle according to an embodiment of the present invention.

The present invention provides a device for detecting a light irradiating angle, wherein the device is used to detect the incident direction of a light ray. Referring to FIG. 1, a device 1 for detecting a light irradiating angle includes a solar sensor 10, a processor 20, and at least one calibration sensor 30. The processor 20, coupled to the solar sensor 10 and the calibration sensor 30, receives the signals from the solar sensor 10 and the calibration sensor 30 to determine the information of the incident direction of the light ray. The information of the incident direction includes a falling point position, an X-axis incident angle, and a Y-axis incident angle.

Figure 2:
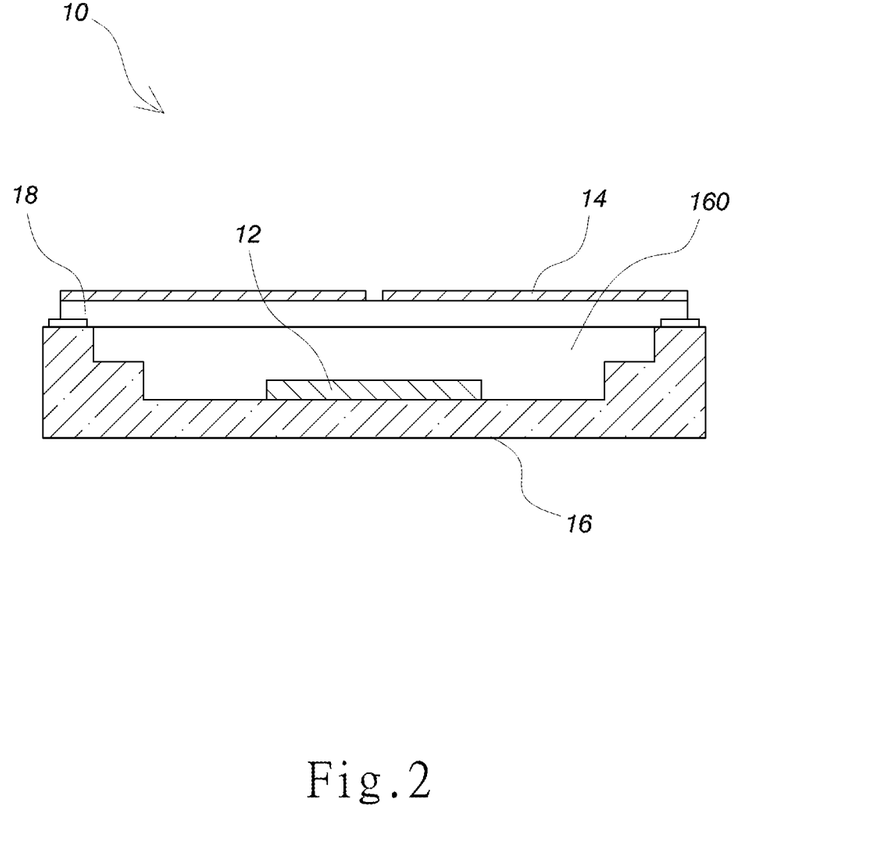
FIG. 2 is a cross-sectional view of a solar sensor according to an embodiment of the present invention.

Referring to FIG. 2, the structure of the solar sensor 10 is introduced as follows. In the embodiment, the solar sensor 10 is a semiconductor component. The solar sensor 10 includes a sensing unit 12, a mask 14, a substrate 16, and a transparent object 18. The transparent object 18 may be a glass plate. The recess 160 of the substrate 16 is used to accommodate the sensing unit 12. The opening of the recess 160 of the substrate 16 is covered with the transparent object 18. The transparent object 18 is provided with the mask 14 thereon. The mask 14 covers the sensing unit 12 to shield a part of the light ray.

Figure 3:
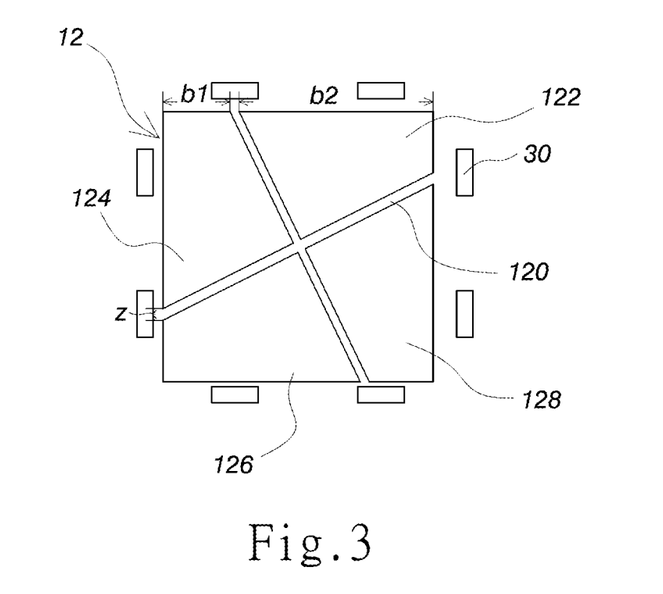
FIG. 3 is a top view of a sensing unit according to an embodiment of the present invention.

Referring to FIG. 3, the structure of the sensing unit 12 is introduced as follows. In the embodiment, the sensing unit 12 is a light sensing component. The sensing unit 12 is a square sensing unit that has crossing lines 120. The crossing lines 120 divide the sensing unit 12 into a first sensing area 122, a second sensing area 124, a third sensing area 126, and a fourth sensing area 128 and divide each edge of the square sensing unit 12 into a first line segment b1 and a second line segment b2. In the embodiment, the ratio of the width z of the crossing line 120 to the length of the first line segment b1 to the length of the second line segment b2 is 1:2:8. Thus, each of the first sensing area 122, the second sensing area 124, the third sensing area 126, and the fourth sensing area 128 divided by the crossing lines 120 has a trapezoid shape. Alternatively, the ratio of the width z of the crossing line 120 to the length of the first line segment b1 to the length of the second line segment b2 is 1:8:2. The present invention is not limited to the ratio of the width z of the crossing line 120 to the length of the first line segment b1 to the length of the second line segment b2.

The first sensing area 122, the second sensing area 124, the third sensing area 126, and the fourth sensing area 128 may respectively generate a first sensing signal, a second sensing signal, a third sensing signal, and a fourth sensing signal based on the intensity of the light ray. The first sensing signal, the second sensing signal, the third sensing signal, and the fourth sensing signal have different currents.

Figure 4:
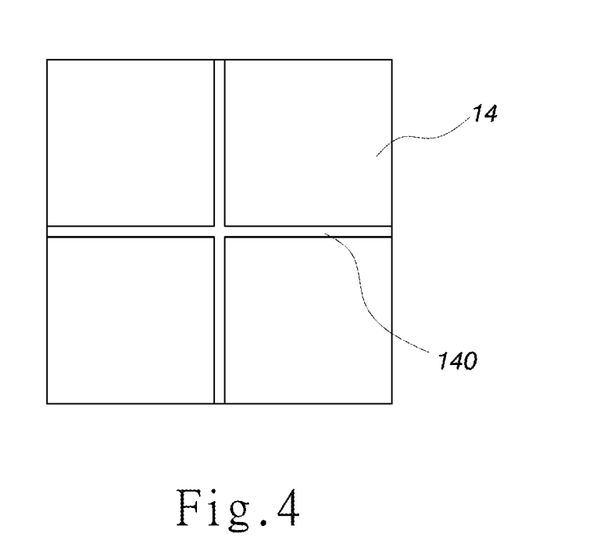
FIG. 4 is a top view of a mask according to an embodiment of the present invention.

Referring to FIG. 4, the structure of the mask 14 is introduced as follows. The mask 14 has an X-shaped light transmitting portion 140. The light ray transmits the X-shaped light transmitting portion 140 to form an X-axis light ray and a Y-axis light ray. The X-axis light ray intersects the Y-axis light ray. The intersection of the X-axis light ray and the Y-axis light ray falls on one of the first sensing area 122, the second sensing area 124, the third sensing area 126, and the fourth sensing area 128.

The processor 20 is coupled to the sensing unit 12. The processor 20 receives the first sensing signal, the second sensing signal, the third sensing signal, and the fourth sensing signal from the first sensing area 122, the second sensing area 124, the third sensing area 126, and the fourth sensing area 128 and determines the information of the incident direction of the light ray based on the first sensing signal, the second sensing signal, the third sensing signal, and the fourth sensing signal.

Referring to FIG. 1 and FIG. 3, the calibration sensor 30 is arranged adjacent to the solar sensor 10 and coupled to the processor 20. The calibration sensor 30 generates and transmits a basing signal to the processor 20. The processor 20 calibrates the first sensing signal, the second sensing signal, the third sensing signal, and the fourth sensing signal to improve the precision of calculating the information of the incident direction in the subsequent process. In detail, the calibration sensor 30 may be a light sensor. The surface of the calibration sensor 30 is covered with a shade (not illustrated), lest the light ray irradiates the calibration sensor 30. The calibration sensor 30 is used to read the present dark current generated due to the ambient temperature or other environmental parameters, and estimate its proportional relationship to eliminate the dark currents generated by the first sensing area 122, the second sensing area 124, the third sensing area 126, and the fourth sensing area 128, thereby improving the operation precision of the processor 20.

After introducing the structure of the present invention, the steps of the method of the present invention are introduced as follows. Refer to FIGS. 1-6. Firstly, in Step S10 and FIG. 6, the light ray transmits the X-shaped light transmitting portion 140 of the mask 14 to form an X-axis light ray L1 and a Y-axis light ray L2. The X-axis light ray L1 intersects the Y-axis light ray L2. The intersection C of the X-axis light ray L1 and the Y-axis light ray L2 falls on one of the first sensing area 122, the second sensing area 124, the third sensing area 126, and the fourth sensing area 128. Thus, the first sensing area 122, the second sensing area 124, the third sensing area 126, and the fourth sensing area 128 respectively generate the first sensing signal, the second sensing signal, the third sensing signal, and the fourth sensing signal based on the intensity of the light ray when the light ray irradiates the solar sensor 10. In the embodiment, the first sensing signal, the second sensing signal, the third sensing signal, and the fourth sensing signal may be currents (I). The generated current is larger when the intensity of the light ray is higher.

Figure 5:
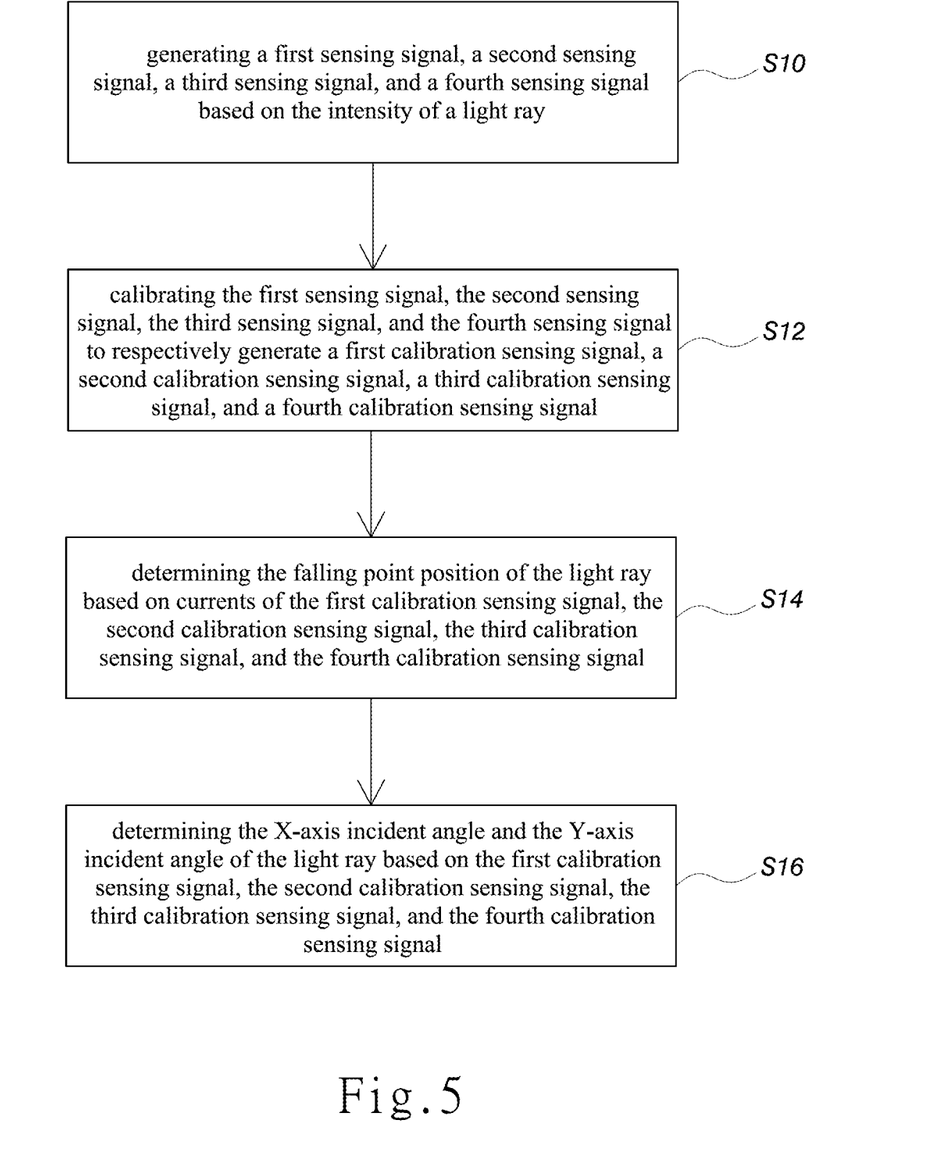
FIG. 5 is a flowchart of a method for detecting a light irradiating angle according to an embodiment of the present invention.
Figure 6:
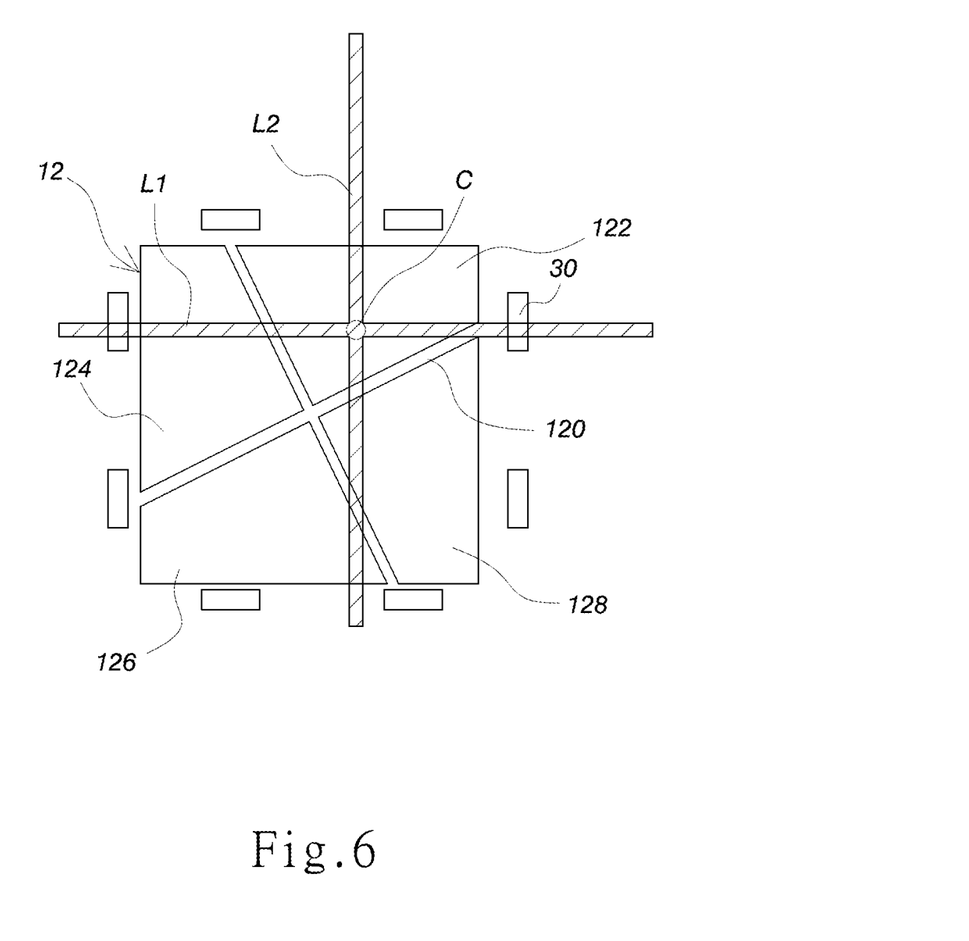
FIG. 6 is a schematic diagram illustrating the state of irradiating a sensing unit with light according to an embodiment of the present invention.

In Step S12, the sensing unit 12 transmits the first sensing signal, the second sensing signal, the third sensing signal, and the fourth sensing signal to the processor 20. Simultaneously, the processor 20 receives the basing signal generated by the calibration sensor 30, and calibrates the first sensing signal, the second sensing signal, the third sensing signal, and the fourth sensing signal to respectively generate a first calibration sensing signal, a second calibration sensing signal, a third calibration sensing signal, and a fourth calibration sensing signal.

In signal calibration, the processor 20 incorporates the basing signal, the first sensing signal, the second sensing signal, the third sensing signal, and the fourth sensing signal into representative calibration equations to lead the first calibration sensing signal, the second calibration sensing signal, the third calibration sensing signal, and the fourth calibration sensing signal. The representative calibration equations include:

$I_1 - D_1 \times \text{magnification} = I_{1c}$;

$I_2 - D_1 \times \text{magnification} = I_{2c}$;

$I_3 - D_1 \times \text{magnification} = I_{3c}$; and $I_4 - D_1 \times \text{magnification} = I_{4c}$;

where $I_1$ represents the first sensing signal, $I_2$ represents the second sensing signal, $I_3$ represents the third sensing signal, $I_4$ represents the fourth sensing signal, $D_1$ represents the basing signal, $I_{1c}$ represents the first calibration sensing signal, $I_{2c}$ represents the second calibration sensing signal, $I_{3c}$ represents the third calibration sensing signal, and $I_{4c}$ represents the fourth calibration sensing signal.

In Step S14, the processor 20 determines the falling point position of the light ray based on currents of the first calibration sensing signal, the second calibration sensing signal, the third calibration sensing signal, and the fourth calibration sensing signal. The falling point position is the position where the intersection C falls on the sensing unit 12. The falling point position is led by incorporating the first calibration sensing signal, the second calibration sensing signal, the third calibration sensing signal, and the fourth calibration sensing signal into representative falling point equations. The representative falling point equations includes:

$I_{1c} > I_{3c}$ & $I_{4c} > I_{2c}$ →falling on the first sensing area;

$I_{1c} > I_{3c}$ & $I_{2c} > I_{4c}$ →falling on the second sensing area;

$I_{3c} > I_{1c}$ & $I_{2c} > I_{4c}$ →falling on the third sensing area; and $I_{3c} > I_{1c}$ & $I_{4c} > I_{2c}$ →falling on the fourth sensing area, where $I_{1c}$ represents the first calibration sensing signal, $I_{2c}$ represents the second calibration sensing signal, $I_{3c}$ represents the third calibration sensing signal, and $I_{4c}$ represents the fourth calibration sensing signal.

In Step S16, the processor 20 determines the X-axis incident angle and the Y-axis incident angle of the light ray based on the first calibration sensing signal, the second calibration sensing signal, the third calibration sensing signal, and the fourth calibration sensing signal. The processor 20 incorporates the first calibration sensing signal, the second calibration sensing signal, the third calibration sensing signal, and the fourth calibration sensing signal into a first representative equation to lead the X-axis incident angle. The first representative equation includes $$\theta_x = \tan^{-1}\left(\frac{(c_L I_{2c} + c_U I_{1c}) - (c_D I_{3c} + c_R I_{4c})}{c_R I_{4c} + c_U I_{1c} + c_L I_{2c} + c_D I_{3c}}\right) \cdot C,$$

where $\theta_x$ represents the X-axis incident angle, $c_U$ represents the weight of the first sensing area, $c_L$ represents the weight of the second sensing area, $c_D$ represents the weight of the third sensing area, $c_R$ represents the weight of the fourth sensing area, C represents a constant, $I_{1c}$ represents the first calibration sensing signal, $I_{2c}$ represents the second calibration sensing signal, $I_{3c}$ represents the third calibration sensing signal, and $I_{4c}$ represents the fourth calibration sensing signal.

The processor 20 incorporates the first calibration sensing signal, the second calibration sensing signal, the third calibration sensing signal, and the fourth calibration sensing signal into a second representative equation to lead the Y-axis incident angle. The second representative equation includes $$\theta_y = \tan^{-1}\left(\frac{((1-c_U)I_{1c} + (1-c_R)I_{4c}) - ((1-c_D)I_{3c} + (1-c_L)I_{2c})}{(1-c_R)I_{4c} + (1-c_U)I_{1c} + (1-c_L)I_{2c} + (1-c_D)I_{3c}}\right) \cdot C,$$

where $\theta_y$ represents the Y-axis incident angle, $c_U$ represents a weight of the first sensing area, $c_L$ represents a weight of the second sensing area, $c_D$ represents a weight of the third sensing area, $c_R$ represents a weight of the fourth sensing area, C represents a constant, $I_{1p}$ represents the first calibration sensing signal, $I_{2c}$ represents the second calibration sensing signal, $I_{3c}$ represents the third calibration sensing signal, and $I_{4c}$ represents the fourth calibration sensing signal.

Using the foregoing method, the incident information of the light ray can be precisely determined. The present invention integrates a four-quadrant solar sensor to reduce the volume of the module and increase the precision of the solar sensor. The present invention adds a calibration sensor for calibrating environmental noise. Thus, when the solar sensor works, the solar sensor can immediately calibrate noise based on the ambient temperature or other environmental parameters, thereby increasing the accuracy of sensing light.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A device for detecting a light irradiating angle, used to detect an incident direction of a light ray, comprising:
   a solar sensor comprising:
      a sensing unit having a first sensing area, a second sensing area, a third sensing area, and a fourth sensing area, wherein the first sensing area, the second sensing area, the third sensing area, and the fourth sensing area are respectively configured to generate a first sensing signal, a second sensing signal, a third sensing signal, and a fourth sensing signal based on an intensity of the light ray; and
      a mask covering the sensing unit and having an X-shaped light transmitting portion, wherein the light ray transmits the X-shaped light transmitting portion to form an X-axis light ray and a Y-axis light ray, the X-axis light ray intersects the Y-axis light ray, and an intersection of the X-axis light ray and the Y-axis light ray falls on one of the first sensing area, the second sensing area, the third sensing area, and the fourth sensing area;
   a processor coupled to the sensing unit and configured to receive the first sensing signal, the second sensing signal, the third sensing signal, and the fourth sensing signal and determine information of the incident direction based on the first sensing signal, the second sensing signal, the third sensing signal, and the fourth sensing signal;
   wherein each of the first sensing area, the second sensing area, the third sensing area, and the fourth sensing area has a shape of an asymmetrical inequilateral trapezoid;
   a calibration sensor, the calibration sensor is arranged adjacent to the solar sensor and coupled to the processor, wherein the calibration sensor is configured to generate and transmit a basing signal to the processor, and the processor is configured to incorporate the basing signal, the first sensing signal, the second sensing signal, the third sensing signal, and the fourth sensing signal into representative calibration equations to lead a first calibration sensing signal, a second calibration sensing signal, a third calibration sensing signal, and a fourth calibration sensing signal, and the representative calibration equations include:

$I_1$-$D_1$×magnification=$I_{1c}$;

$I_2$-$D_1$×magnification=$I_{2c}$;

$I_3$-$D_1$×magnification=$I_{3c}$; and $I_4$-$D_1$×magnification=$I_{4c}$;

where $I_1$ represents the first sensing signal, $I_2$ represents the second sensing signal, $I_3$ represents the third sensing signal, $I_4$ represents the fourth sensing signal, $D_1$ represents the basing signal, $I_{1c}$ represents the first calibration sensing signal, $I_{2c}$ represents the second calibration sensing signal, $I_{3c}$ represents the third calibration sensing signal, and $I_{4c}$ represents the fourth calibration sensing signal;
   wherein the information of the incident direction includes an X-axis incident angle and a Y-axis incident angle, the processor is configured to incorporate the first calibration sensing signal, the second calibration sensing signal, the third calibration sensing signal, and the fourth calibration sensing signal into a first representative equation to lead the X-axis incident angle, the first representative equation includes $$\theta_x = \tan^{-1}\left(\frac{(c_L I_{2c} + c_U I_{1c}) - (c_D I_{3c} + c_R I_{4c})}{c_R I_{4c} + c_U I_{1c} + c_L I_{2c} + c_D I_{3c}}\right) \cdot C,$$

the processor is configured to incorporate the first calibration sensing signal, the second calibration sensing signal, the third calibration sensing signal, and the fourth calibration sensing signal into a second representative equation to lead the Y-axis incident angle, and the second representative equation includes $$\theta_y = \tan^{-1}\left(\frac{((1-c_U)I_{1c} + (1-c_R)I_{4c}) - ((1-c_D)I_{3c} + (1-c_L)I_{2c})}{(1-c_R)I_{4c} + (1-c_U)I_{1c} + (1-c_L)I_{2c} + (1-c_D)I_{3c}}\right) \cdot C,$$

where $\theta_x$ represents the X-axis incident angle, $\theta_y$, represents the Y-axis incident angle, $c_U$ represents a weight of the first sensing area, $c_Y$ represents a weight of the second sensing area, $c_D$ represents a weight of the third sensing area, $c_R$ represents a weight of the fourth sensing area, and C represents a constant.

2. The device for detecting a light irradiating angle according to claim 1, wherein the sensing unit is a square sensing unit that has crossing lines, the crossing lines divide the sensing unit into the first sensing area, the second sensing area, the third sensing area, and the fourth sensing area and divide each edge of the square sensing unit into a first line segment and a second line segment, and a ratio of a length of the first line segment to a length of the second line segment is 2:8 or 8:2.

3. The device for detecting a light irradiating angle according to claim 1, wherein the information of the incident direction includes a falling point position, the falling point position is led by incorporating the first calibration sensing signal, the second calibration sensing signal, the third calibration sensing signal, and the fourth calibration sensing signal into representative falling point equations, and the representative falling point equations includes:

$I_{1c} > I_{3c}$ & $I_{4c} > I_{2c}$ →falling on the first sensing area;

$I_{1c} > I_{3c}$ & $I_{2c} > I_{4c}$ →falling on the second sensing area;

$I_{3c} > I_{1c}$ & $I_{2c} > I_{4c}$ →falling on the third sensing area; and $I_{3c} > I_{1c}$ & $I_{4c} > I_{2c}$ →falling on the fourth sensing area.

4. A method for detecting a light irradiating angle applied to the device of claim 1, the method comprising:
generating the first sensing signal, the second sensing signal, the third sensing signal, and the fourth sensing signal based on the intensity of the light ray, wherein the first sensing signal, the second sensing signal, the third sensing signal, and the fourth sensing signal are respectively generated by the first sensing area, the second sensing area, the third sensing area, and the fourth sensing area of a sensing unit;
calibrating the first sensing signal, the second sensing signal, the third sensing signal, and the fourth sensing signal to respectively generate a first calibration sensing signal, a second calibration sensing signal, a third calibration sensing signal, and a fourth calibration sensing signal;
determining a falling point position of the light ray based on currents of the first calibration sensing signal, the second calibration sensing signal, the third calibration sensing signal, and the fourth calibration sensing signal; and
determining an X-axis incident angle and a Y-axis incident angle of the light ray based on the first calibration sensing signal, the second calibration sensing signal, the third calibration sensing signal, and the fourth calibration sensing signal.

5. The method for detecting a light irradiating angle according to claim 4, wherein in the step of determining the falling point position of the light ray based on the currents of the first calibration sensing signal, the second calibration sensing signal, the third calibration sensing signal, and the fourth calibration sensing signal, the falling point position is led by incorporating the first calibration sensing signal, the second calibration sensing signal, the third calibration sensing signal, and the fourth calibration sensing signal into representative falling point equations, and the representative falling point equations includes:

$I_{1c} > I_{3c}$ & $I_{4c} > I_{2c}$ →falling on the first sensing area;

$I_{1c} > I_{3c}$ & $I_{2c} > I_{4c}$ →falling on the second sensing area;

$I_{3c} > I_{1c}$ & $I_{2c} > I_{4c}$ →falling on the third sensing area; and $I_{3c} > I_{1c}$ & $I_{4c} > I_{2c}$ →falling on the fourth sensing area, where $I_{1c}$ represents the first calibration sensing signal, $I_{2c}$ represents the second calibration sensing signal, $I_{3c}$ represents the third calibration sensing signal, and $I_{4c}$ represents the fourth calibration sensing signal.

* * * * *